March 20, 1962 H. C. HEUSER 3,025,729
TOOL HOLDER
Filed Nov. 3, 1958 2 Sheets-Sheet 1
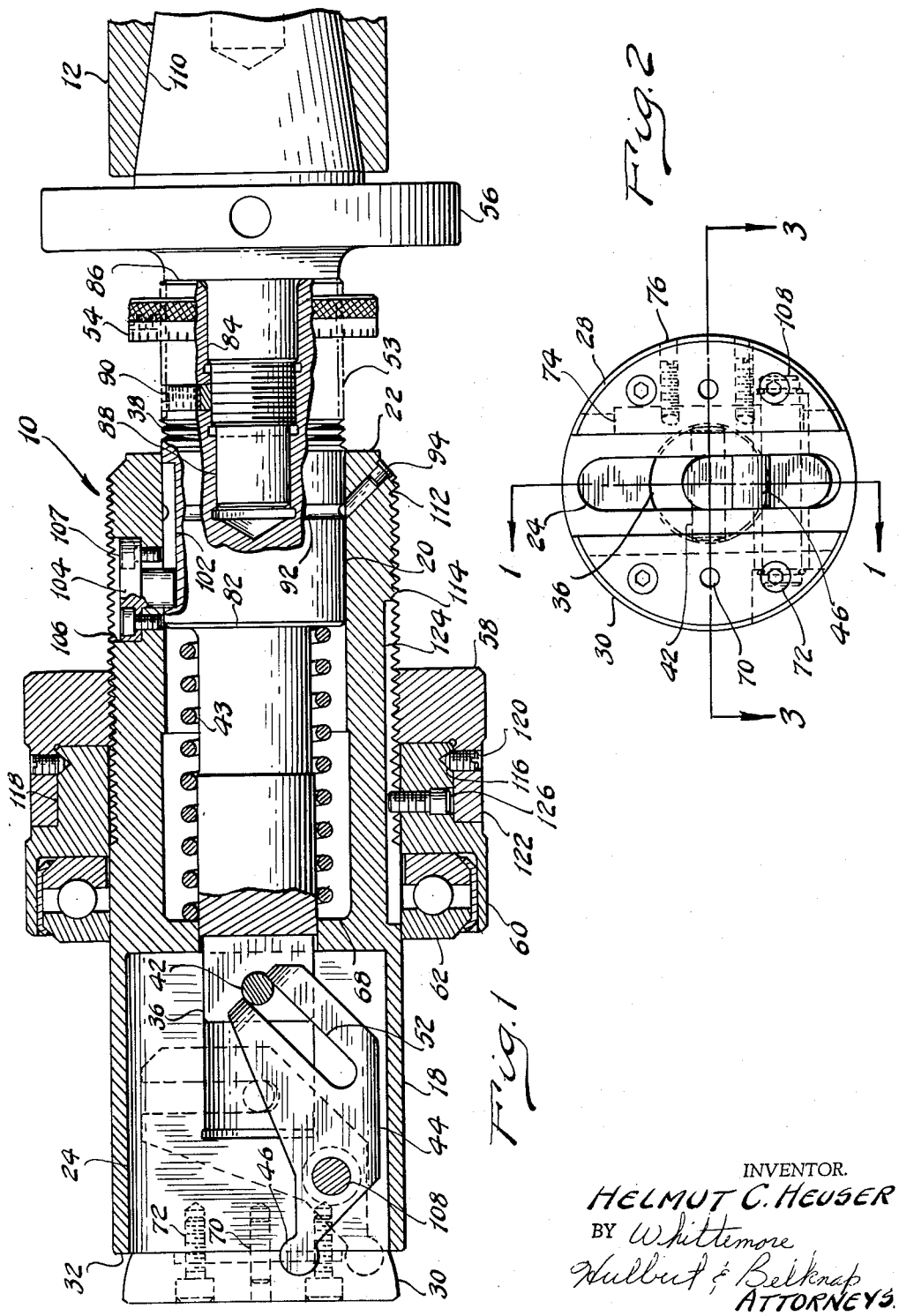
INVENTOR.
HELMUT C. HEUSER
BY Whittemore
Hulbert & Belknap
ATTORNEYS.

March 20, 1962  H. C. HEUSER  3,025,729
TOOL HOLDER
Filed Nov. 3, 1958  2 Sheets-Sheet 2

INVENTOR.
HELMUT C. HEUSER
BY Whittemore
Hulbert & Belknap
ATTORNEYS.

United States Patent Office 3,025,729
Patented Mar. 20, 1962

3,025,729
TOOL HOLDER
Helmut C. Heuser, Birmingham, Mich., assignor to Bokum Tool Company, Inc., Detroit, Mich., a corporation of Michigan
Filed Nov. 3, 1958, Ser. No. 771,602
9 Claims. (Cl. 77—58)

This invention relates to a tool holder and refers more particularly to a tool holder for use in conjunction with an axially movable rotating spindle to axially advance a cutting tool toward a work piece and when the cutting tool and the work piece are in a predetermined relation to move the cutting tool radially into engagement with said work piece.

In the manufacture of machined articles it is often necessary to produce grooves or recesses in the interior or on the exterior of radially formed members. In the past the production of these grooves and recesses has required separate tools for work pieces of different radii and for different depths of cuts. These separate tools have required time consuming changing during machining operations.

Therefore it is one of the essential objects of this invention to provide a rotating tool holder having means included therein to radially move a tool held thereby.

Another object is to provide a rotating tool holder with lever means to advance a cutting tool in a direction transverse of the tool holder.

Another object is to provide an axially movable rotating tool holder including adjustable means to halt axial movement of a cutting tool carried thereby when said tool is in a predetermined relationship with a work piece.

Another object is to provide a rotating tool holder with adjustable means to limit the radial travel of a cutting tool carried thereby.

Another object is to provide a tool holder adapted to be rotated and moved axially with respect to a work piece with means to limit the axial travel of a portion thereof whereby radial movement of a tool carried thereon is accomplished through lever means on continued axial movement of the rest of the tool holder.

Another object is to provide a tool holder which is simple in construction, easy to produce and efficient in use.

Other objects and features of the invention will become apparent as the description proceeds, especially when taken in conjunction with the accompanying drawings, illustrating a preferred embodiment of the invention, wherein:

FIGURE 1 is a longitudinal section view of a tool holder according to the present invention taken on line 1—1 of FIGURE 2.

FIGURE 2 is an end view of the tool holder of FIGURE 1.

Figure 3:
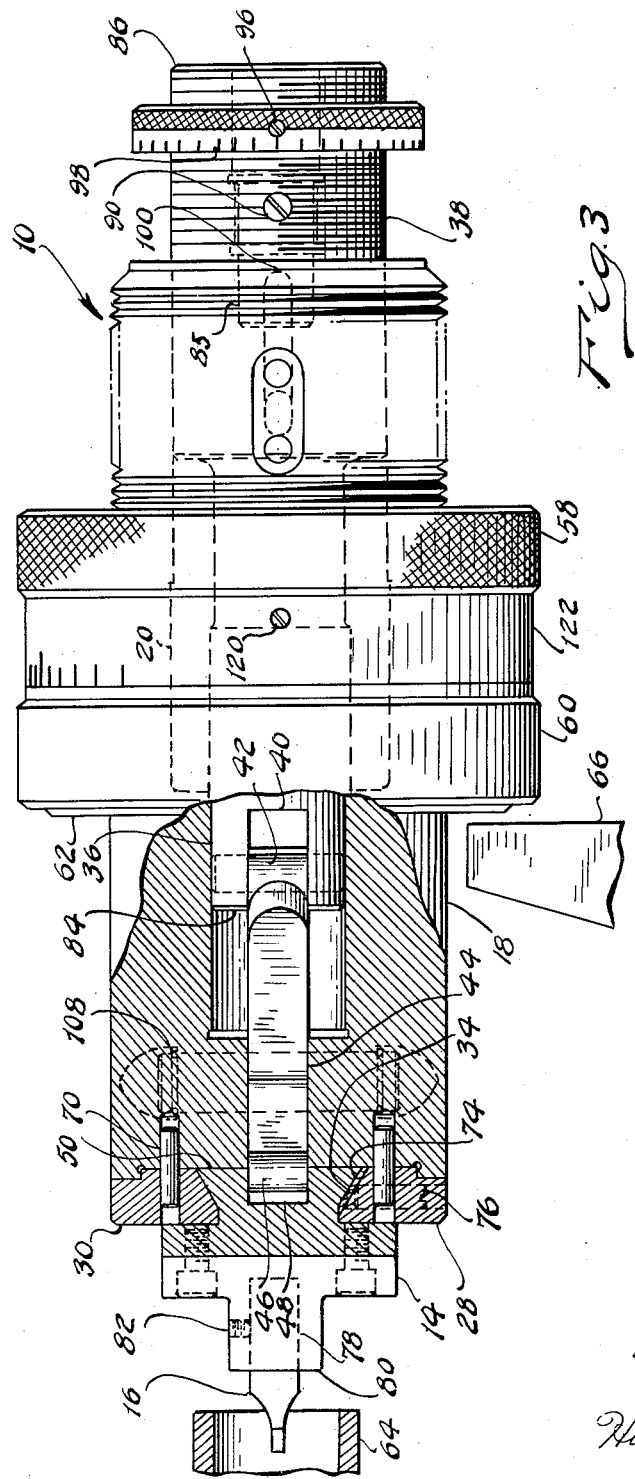
FIGURE 3 is a top view of the tool holder of FIGURE 1 partly in section on line 3—3 of FIGURE 2.

The embodiment of the present invention illustrated in the figures is a tool holder generally designated 10 shown with one end inserted in a chuck 12 capable of imparting rotary and axial movement to the tool holder. A slide 14 holding a cutting tool 16 is attached to the other end of tool holder 10. Rotary and axial movement are imparted through tool holder 10 to tool 16 from chuck 12. Radial adjustment of tool 16 is accomplished by tool holder 10 in a manner to be described.

Tool holder 10 includes a body member 18 having a bore 20 in one face 22 thereof and a slot 24 in the opposite face 32. End plates 28 and 30 are mounted on end face 32 of body member 18 providing a dovetail slot 34 parallel to slot 24 in which slide 14 is positioned. One end 36 of an actuating bar 38 having an axial slot 40 therein across which drive pin 42 is positioned is inserted within the bore 20 in body member 18. A spring 43 is provided within bore 20 biasing actuating bar 38 in a direction to oppose insertion of end 36 of actuating bar 38 in bore 20. A lever 44 is pivotally mounted within slot 24. One end 46 of lever 44 engages recess 48 in bottom 50 of slide 14. The other end of lever 44 has a slot 52 therein inclined at an angle to the axis of bore 20. The other end 53 of actuating bar 38 has an adjustable lock nut 54 attached thereto and is also secured to an adapter 56 which is mounted for axial and rotary movement in chuck 12. A stop collar 58, bearing cap 60 and thrust bearing 62 are provided in conjunction with body member 18.

In operation rotating tool holder 10 is moved axially toward a work piece 64 by means of chuck 12. When tool 16 is in a predetermined relationship with work piece 64 thrust bearing 62 engages a stationary abutment 66 thereby halting axial movement of tool 16 by means of bearing cap 60, collar 58, body member 18, end plates 28 and 30 and slide 14. On further axial movement of chuck 12, adapter 56 and therefore actuating bar 38 move axially with respect to body member 18. Movement of end 36 of actuating bar 38 into bore 20 in opposition to spring 43 causes engagement of slot 52 by drive pin 42 whereby lever 44 is pivoted causing end 46 to move slide 14 and tool 16 radially with respect to the axis of rotation of tool holder 10. Lock nut 54 limits the depth of insertion of actuating bar 38 in bore 20 thereby limiting the possible radial adjustment of tool 16.

With radial adjustment of cutting tool 16 it is possible to perform cutting operations on work pieces of different sizes or to make different cuts in work pieces of the same size without changing tools thereby increasing the efficiency of the machining operations.

Body member 18 as illustrated in the drawings is a cylindrical member having a bore 20 in end face 22 thereof extending to within a short distance of opposite end face 32. Bore 20 is provided with annular shoulder 68 against which coil spring 43 may bear. A transverse slot 24 as best shown in FIGURE 3 is provided in end face 32 of body member 18 extending into bore 20 within body member 10.

End plates 28 and 30 formed as shown best in FIGURES 2 and 3 are secured to end face 32 of body member 14 by means of dowels 70 and screws 72. End plates 28 and 30 form a dovetail slot 34 parallel to slot 24 in face 32 of body member 18 to receive slide 14. A spacer 74 and set screws 76 are provided in conjunction with end plate 28 to secure slide 14 in dovetail slot 34.

Slide 14 carrying cutting tool 16 is mounted on tool holder 10 for transverse movement in dovetail slot 34 as indicated in FIGURE 3. A rectangular recess 48 in the bottom 50 of slide 14 is provided to receive end 46 of lever 44. Cutting tool 16 may be secured in a bore 78 in face 80 of slide 14 by means of set screw 82.

Actuating bar 38 as shown in the drawings is a cylindrical member having a smaller diameter at end 36 than at end 53 with an abutment 82 formed at the transition between the members. A transverse slot 40 extends axially into end face 84 of end 36 of bar 38. A drive pin 42 extends across slot 40 perpendicular thereto. Both ends of pin 42 are secured to bar 38. End 36 of bar 38 is adapted to be inserted within bore 20 of body member 18 with spring member 43 acting between abutment 82 on bar 38 and shoulder 68 on body 18 to resist insertion of end 36 of bar 38 into bore 20 of body member 18.

End 53 of actuating bar 38 has bore 85 in face 86 thereof formed as shown to receive end 88 of adapter 56. Set screw 90 secures adapter 56 in bore 84. End 53 is also provided with annular groove 92 positioned as shown which in conjunction with valve 94 on body member 18 allows lubrication of bore 20 of body member 18. Threads are cut into end 53 of bar 38 to receive lock nut 54. Lock nut 54 serves to limit the depth of insertion of actuating bar 38 into bore 20 and is provided with set screw 96 to lock it at a particular setting, as determined by scale 98 on nut 54 and scribe line 100 on body member 18.

A longitudinal slot 102 is provided in the side of end 53 of bar 38 to receive a key 104 held in recess 106 in body member 18 by screw 107. The key 104 and slot 102 function to set outer limits on both the insertion and withdrawal of bar 38 in bore 20 and also to prevent rotation of bar 38 in bore 20 thereby insuring continued proper alignment between body member 18 and actuating bar 38.

Lever 44 is pivotally mounted by pin 108 in slot 24. End 46 of lever 44 in the shape of a cylinder as indicated fits within recess 48 in the surface 50 of slide 14. When lever 44 is pivoted around pin 108 slide 14 is caused by end 46 to move within dovetail slot 34 in a direction transverse of tool holder 10. A slot 52 inclined to the axis of bore 20 is provided in the other end of lever 44 as indicated best in FIGURE 1. Lever 44 and actuating bar 38 are so aligned that on insertion of actuating bar in bore 20 lever 44 fits within slot 40 in bar 38 and drive pin 42 engages slot 52 in lever 44. Continued axial movement of actuating bar 38 in bore 20 will then cause lever 44 to pivot on pin 108 whereby slide 14 and cutting tool 16 are moved transverse of tool holder 10 as previously set forth.

Adapter 56 may be in the form shown in the figures and as previously indicated has end 88 securely fastened to end 53 of actuating bar 38. End 110 of adapter 56 is constructed to be received in a chuck or spindle 12. Chuck 12 functions to impart rotation and axial movement to tool holder 10 and in itself forms no part of the present invention.

A stop collar 58 as shown is threaded on threads 112 provided on end 114 of body member 18. A bearing cap 60 having thrust bearing 62 mounted therein is attached to stop collar 58 by means of annular groove 116 in flange 118 of bearing cap 60 and set screws 120 in flange 122 of stop collar 58. A slot 124 is provided in body member 18 as shown to receive key 126 extending through flange 118 of bearing cap 60 to prevent rotation of bearing cap 60 with thrust bearing 62.

In use the tool holder 10 as above described carrying slide 14 with tool 16 attached thereto is inserted in chuck 12. A work piece 64 in which it is desired to produce for example an interior annular recess is positioned axially of tool holder 10. By means of chuck 12 tool holder 10 is rotated and advanced axially toward workpiece 64. When tool 16 is in the correct axial position to produce the desired recess thrust bearing 62 contacts a rigid abutment 66 which may be movably mounted on the machine carrying the chuck 12. The axial relation between the work piece 64 and cutting tool 16 at the time of contact of abutment 66 with thrust bearing 62 may be adjusted by turning stop collar 58 thereby adjusting the position of thrust bearing 62 on body member 18. When thrust bearing 62 contacts abutment 66 axial movement of body member 18 carrying slide 14 and tool 16 is halted. Further axial movement of chuck 12 causes actuating bar 38 to move axially within bore 20 in opposition to spring 43. Drive pin 42 engages slot 52 in lever 44 causing lever 44 to pivot about pin 108. Pivoting of lever 44 moves end 46 thereof positioned in recess 48 of slide 14 whereby slide 14 and cutting tool 16 are moved radially with respect to the rotation of tool holder 10. Cutting tool 16 therefore contacts work piece 64 to produce the desired recess. The amount of radial adjustment of tool 16 may be limited by the setting of lock nut 54 to limit the insertion of actuating bar 38 in bore 20.

The drawings and the foregoing specification constitute a description of the improved tool holder in such full, clear, concise and exact terms as to enable any person skilled in the art to practice the invention, the scope of which is indicated by the appended claims.

What I claim as my invention is:

1. A tool holder comprising a body member having a bore in one face thereof and a slot in the opposite face, said slot being transverse of and in communication with said bore, a pair of separate end plates mounted on said opposite face forming a dovetail slot therebetween parallel to the first mentioned slot, a slide adapted to carry a cutting tool positioned within said dovetail slot for movement transverse to the longitudinal bore axis and having a recess in the bottom thereof, an actuating bar having one end inserted within said bore, said end having an axial slot therein, a drive pin mounted across the axial slot, a lever pivotally mounted within said first mentioned slot, one end of the lever being inserted in the recess in said slide, the other end of the lever having a slot therein inclined to the axis of said bore, the drive pin engaging said inclined slot on axial movement of the actuating bar within said bore to pivot said lever whereby said slide is moved transverse to said bore axis, an adapter removably secured at one end to the other end of said actuating bar, the other end of the adapter being held within a spindle whereby rotary and axial movement may be imparted to said tool holder and adjustable means secured to said body member to halt the axial movement in the direction of said slide of the body member and the end plates and slide mounted thereon when said cutting tool is in a predetermined axial position whereby further axial movement of the actuating bar within said bore moves the slide radially adjusting the cutting tool.

2. The structure claimed in claim 1 wherein said adjustable means includes a stop collar threaded on the exterior of the body member, a bearing cap having an annular groove therein, set screws extending through said stop collar and into said annular groove to attach said stop collar to said bearing cap and a thrust bearing mounted within the bearing cap whereby axial movement in one direction of a portion of the rotating tool holder may be halted.

3. The structure claimed in claim 2 wherein slot and key means are provided between said bearing cap and body member operable to prevent rotation and allow axial movement of said bearing cap relative to said body member.

4. The structure as claimed in claim 3 and further adjustable means to halt the axial insertion of the actuating bar within said bore to limit the radial adjustment of the cutting tool including a lock nut adjustably secured on said actuating bar positioned to abut said one face of the body member when said actuating bar is inserted within said bore a predetermined distance.

5. In combination with a tool holder including a body member having a bore therein and a tool carrying slide mounted on the body member opposite the bore for movement transverse to the bore axis, the tool holder also including an actuating bar having an axially slotted end inserted in the bore and lever means pivotally attached to the body member and interposed between the slide and bar to move the slide transversely to the tool holder upon axial movement of the actuating bar within the bore; adjustable means secured to the body member to halt axial movement of the body member and slide toward a workpiece when the tool holder is in a predetermined axial position with respect to a workpiece including a stop collar threaded on the exterior of the body member, a bearing cap having an annular groove therein, set screws extending through said stop collar and into said annular groove operable to prevent axial separation of said stop collar and said bearing cap while permitting relative rotation therebetween and a thrust bearing mounted within the bearing cap adapted to abut against a rigid surface.

6. In combination with a tool holder including a body member having a bore therein and a tool carrying slide mounted on the body member opposite the bore for movement transverse to the bore axis, the tool holder also including an actuating bar having an axially slotted end inserted in the bore and lever means pivotally attached to the body member and interposed between the slide and bar to move the slide transversely to the tool holder upon axial movement of the actuating bar within the bore; adjustable means secured to the body member to halt axial movement of the body member and slide toward a workpiece when the tool holder is in a predetermined axial position with respect to a workpiece including a stop collar threaded on the exterior of the body member, a bearing cap having an annular groove therein, set screws extending through said stop collar and into said annular groove to attach said stop collar to said bearing cap operable to prevent axial separation of said stop collar and said bearing cap while permitting relative rotation therebetween, a thrust bearing mounted within the bearing cap adapted to abut against a rigid surface, and means operably associated with said bearing cap for preventing rotation thereof and allowing axial movement thereof relative to said body member.

7. In combination with a tool holder including a body member having a bore therein and a tool carrying slide mounted on the body member opposite the bore for movement transverse to the bore axis, the tool holder also including an actuating bar having an end inserted in the bore and lever means interposed between the slide and bar to move the slide transversely to the tool holder upon axial movement of the actuating bar within the bore; adjustable means secured to the body member to halt axial movement of the body member and slide toward a workpiece when the tool holder is in a predetermined axial position with respect to a workpiece including a stop collar threaded on the exterior of the body member, a bearing cap having an annular groove therein, set screws extending through said stop collar and into said annular groove operable to prevent axial separation of said stop collar and said bearing cap while permitting relative rotation therebetween and a thrust bearing mounted within the bearing cap adapted to abut against a rigid surface.

8. In combination with a tool holder including a body member having a bore therein and a tool carrying slide mounted on the body member opposite the bore for movement transverse to the bore axis, the tool holder also including an actuating bar having an end inserted in the bore and lever means interposed between the slide and bar to move the slide transversely to the tool holder upon axial movement of the actuating bar within the bore; adjustable means secured to the body member to halt axial movement of the body member and slide toward a workpiece when the tool holder is in a predetermined axial position with respect to the workpiece including a stop collar axially adjustably secured to said body member, a bearing cap positioned adjacent said stop collar, means securing said bearing cap and stop collar together for axial movement and permitting relative rotation therebetween, means for preventing relative rotation between the bearing cap and body member and permitting relative axial movement therebetween, and a thrust bearing mounted within the bearing cap for abutting against a rigid surface with the body member in a predetermined position relative thereto.

9. In combination with a tool holder having a body member adapted to be axially advanced toward a relatively rotatable workpiece, adjustable means secured to the body member to halt movement of the body member toward the workpiece when the tool holder is in a predetermined axial position with respect to the workpiece including a stop collar axially adjustably secured to said body member, a bearing cap positioned adjacent said stop collar, means securing said bearing cap and stop collar together for axial movement and permitting relative rotation therebetween, means for preventing relative rotation between the bearing cap and body member and permitting relative axial movement therebetween, and a thrust bearing mounted within the bearing cap for abutting against a rigid surface with the body member in a predetermined position relative thereto.

References Cited in the file of this patent
UNITED STATES PATENTS

| | | |
|---|---|---|
| 1,530,593 | Calkins | Mar. 24, 1925 |
| 1,907,178 | Crosby et al. | May 2, 1933 |
| 2,247,283 | Young | June 24, 1941 |
| 2,395,121 | Hodges | Feb. 19, 1946 |
| 2,433,976 | Babka | Jan. 6, 1948 |
| 2,716,360 | Cogsdill | Aug. 30, 1955 |
| 2,745,668 | Haas | May 15, 1956 |